Sept. 8, 1953          J. HALLER                    2,651,180
            COMPOUND HYDRAULIC MOTOR FOR MOLDING PRESSES
Filed May 18, 1949                              6 Sheets-Sheet 1

Inventor
John Haller
By Barthel & Bugbee
Attorneys

Sept. 8, 1953  J. HALLER  2,651,180
COMPOUND HYDRAULIC MOTOR FOR MOLDING PRESSES
Filed May 18, 1949  6 Sheets-Sheet 5

Inventor
John Haller
Barthel & Bugbee
Attorneys

Patented Sept. 8, 1953

2,651,180

UNITED STATES PATENT OFFICE 2,651,180

COMPOUND HYDRAULIC MOTOR FOR MOLDING PRESSES

John Haller, Northville, Mich.

Application May 18, 1949, Serial No. 93,936

4 Claims. (Cl. 60—97)

This invention relates to molding presses and processes and, in particular, to powdered metal molding presses and processes.

One object of this invention is to provide a molding press for making elongated powdered metal workpieces wherein compensation is provided for the friction arising between the powdered metal and the wall of the die cavity which otherwise causes a lower density to be obtained in the middle of the bushing than near the ends thereof.

Another object is to provide a molding press for making elongated powdered metal workpieces wherein a floating table is provided for supporting the die, this floating table being yieldably supported, as by fluid pressure cylinders and pistons, so that it may be backed off away from the molding plunger at any desired pressure.

Another object is to provide a molding press for making elongated powdered metal workpieces of the foregoing character wherein a pressure responsive releasing device is provided which permits the floating table to yield in a direction away from the direction of motion of the molding plunger upon the attainment of a predetermined molding pressure, thereby permitting the density of the intermediate portions of the workpiece to be increased without the necessity of applying excessive molding pressures to the end portions of the workpiece and enabling a more uniform density to be obtained throughout the workpiece.

Another object is to provide a molding press for making elongated powdered metal workpieces wherein a workpiece may be molded, as desired, either to predetermined dimensions regardless of its density, or to a predetermined density, regardless of its dimensions, the density finally obtained being more uniform than that hitherto obtainable by conventional presses and processes.

Another object is to provide a molding press for making powdered metal workpieces wherein an improved cylinder and piston unit is provided for actuating the molding plungers, so that a more precise control is obtained over the molding operation.

Another object is to provide a molding press for making powdered metal workpieces with flanges wherein the density of the flange may, if desired, be made to a predetermined density which is different from the density of the remainder of the workpiece.

Another object is to provide a process of making powdered metal workpieces, particularly elongated workpieces, wherein the powdered material of the workpiece is compressed in the die cavity from opposite directions and wherein the die cavity itself is permitted to yield according to the attainment of a predetermined pressure so that the binding effect of friction on the side walls of the die cavity is counteracted and a more uniform density obtained throughout the workpiece.

General arrangement

Hitherto, in the molding of powdered metal workpieces it has been difficult to obtain a uniform density or even a satisfactory density throughout the workpiece, especially if the workpiece is elongated. If the molding is accomplished by a plunger entering the die cavity from one direction only, the plunger moves only a short distance into the cavity before the engagement of the powdered metal particles with the side walls of the cavity sets up so much friction as to greatly impede the progress of the plunger and reduce the force actually transmitted to the particles in the center of the die cavity. As a consequence, the portions of the workpiece nearest the mouth of the die cavity receive the greatest density whereas those at a considerable distance from the mouth of the cavity receive an unsatisfactorily light density.

In my co-pending application, Serial No. 780,851, filed October 20, 1947 for Briquetting Machine, on which U. S. Patent No. 2,608,826 was issued September 2, 1952, there is disclosed and claimed a molding press which solves this problem for workpieces of ordinary density or for workpieces which are not of excessive length.

In the molding press disclosed in this prior application, the die cavity is open at its opposite ends and is provided with plungers entering the die cavity through these opposite ends and moving in opposite directions toward the central portion of the die cavity. Where the workpiece to be molded is greatly elongated, or where an unusually high or uniform density is desired, prior molding presses and processes have been frequently found inadequate, and this inadequacy resulted in the invention of the present molding press and process of molding powdered metal articles.

In general, the molding press of the present invention consists of a frame having reciprocating hydraulic motors mounted at its opposite ends for motion toward one another. The word "hydraulic" as used herein is not to be restricted to its narrow meaning of water alone, but is to be understood as to apply to oil or any other pressure fluid used in molding presses. The motors just mentioned are connected to platens which in turn carry molding plungers. The molding plungers are adapted to enter the die cavity or bore of a die which is carried by a reciprocable table. The table in turn is yieldably supported by fluid pressure operated mechanism in such a manner as to be yieldable upon the attainment of a predetermined pressure. In this manner, when one of the molding plungers has penetrated a certain distance into the die cavity and in compressing the powdered metal has set up a given amount of resistance by the friction of the powdered metal with the wall of the die cavity, the table carrying the die is permitted to yield, causing the force to be transmitted onward to a portion of the die cavity more remote from the mouth thereof and consequently building up the density of the molded workpiece in that more remote region. Thus, the workpiece becomes progressively denser in portions more remote from the mouth of the die cavity as the table is permitted to yield, until the entire workpiece is compressed. The yielding of the table and the consequent reduction of the binding effect of friction of the metal particles on the die cavity side walls impart a more uniform density to the workpiece at locations remote from the mouth or mouths of the die cavity.

In the process of molding powdered metal workpieces according to the present invention, the powdered metal charge in the die cavity is subjected to an initial compression until the resistance reaches a predetermined force, whereupon the die cavity itself is permitted to yield and move relatively to the force applying member, causing the compression to be accomplished in successive stages and a more uniform density to be obtained in the molded workpiece.

General construction of molding press

Figure 1:
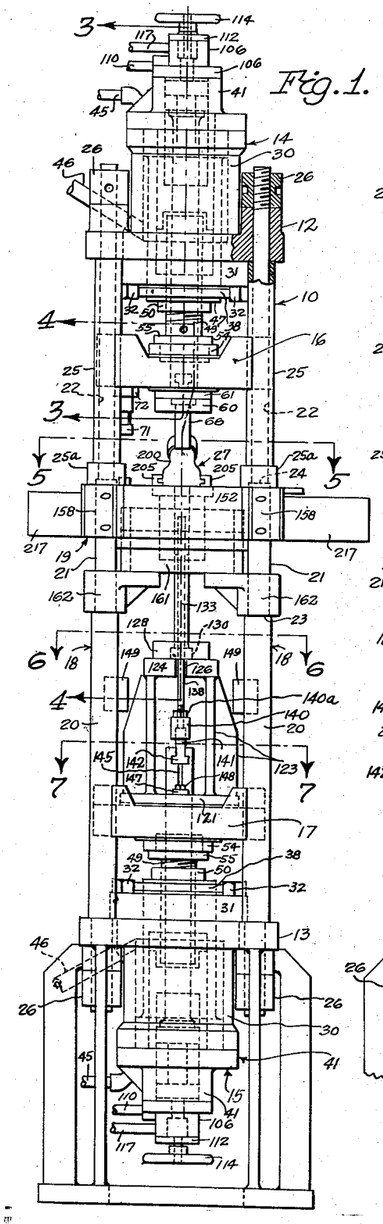
Figure 1 is a side elevation of a powdered metal molding press, according to one form of the invention.
Figure 4:
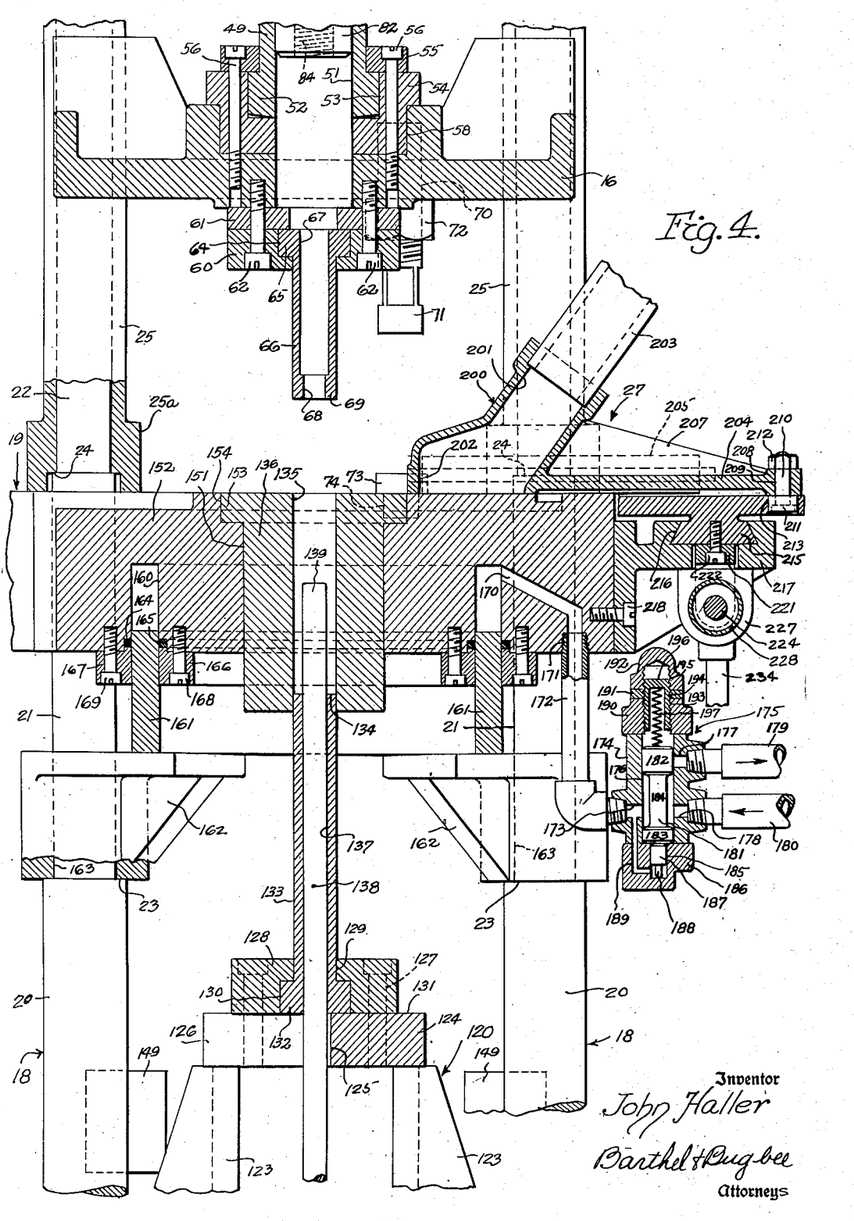
Figure 4 is an enlarged central vertical section through the central portion of the press, taken along the line 4—4 in Figure 1 and showing the floating die table.

Referring to the drawings in detail, Figure 1 shows an improved molding press, generally designated 10, according to a preferred form of the invention, as consisting generally of a frame 11 having at its opposite ends heads 12 and 13 upon which are mounted oppositely reciprocating hydraulic motors or rams 14 and 15 respectively connected to upper and lower platens 16 and 17 which are reciprocable along the strain rods 18. Also mounted upon the strain rods 18 between the upper and lower platens 16 and 17 is a floating die table unit generally designated 19. Each strain rod 18 is provided with a large diameter portion 20 and with successively reduced diameter portions 21 and 22. Each strain rod 18 is provided with an annular shoulder 23 between the large diameter portion 20 and the intermediate diameter portion 21, and with a second annular shoulder 24 between the intermediate diameter portion 21 and the small diameter portion 22. The floating table unit 19, described in more detail below, rests upon the lower shoulders 23. The upper small diameter portions 22 of the strain rods 18 are provided with tubular spacers 25 arranged between the table unit 19 and the upper press head 12 and having enlargements 25a resting upon the shoulders 24 (Figure 4). The strain rods 18 are threaded at their opposite ends to receive nuts 26 by which the frame 11 is held in assembly. The table unit 19 is provided with a die cavity charging device, generally designated 27.

*Reciprocable fluid pressure motor construction*

The reciprocable fluid pressure motors 14 and 15 at the upper and lower ends of the molding press 10, together with their platens 16 and 17, are of similar construction, hence a single description will suffice for both. The upper motor 14 is shown in detail in Figures 3 and 8, with its platen 16 also shown in vertical section in Figure 4.

Figures 3, 8:
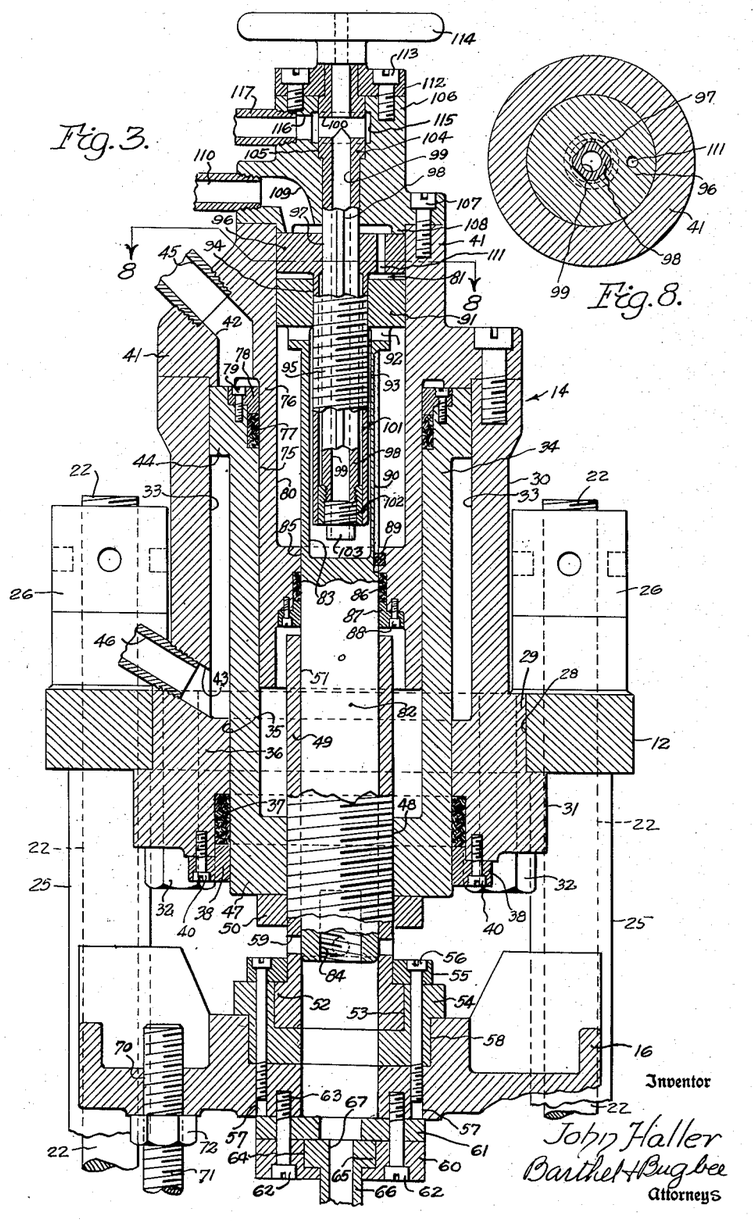
Figure 3 is an enlarged central vertical section through one of the fluid pressure cylinder and piston units taken along the line 3—3 in Figure 1.
Figure 8 is a cross-section taken along the line 8—8 in Figure 3, showing details of the stroke adjustment of the piston and cylinder unit.

The head 12 or 13 is provided with an aperture 28 into which the reduced diameter portion 29 of the outer cylinder 30 fits, the cylinder 30 having a flange 31 held in engagement with the inner side of the press head 12 or 13 by bolts 32. The cylinder 30 is provided with a bore 33 in which an outer hollow piston 34 reciprocates. The piston 34 passes through a throat 35 in the end wall 36 of the cylinder 30 and leakage around it is prevented by a packing 37 compressed by an annular gland 38 secured to the flanged portion 31 of the cylinder 30 by the screws 40. The upper end of the cylinder bore 33 is closed by an outer cylinder head 41, and ports 42 and 43 in the cylinder head 41 and cylinder 30 respectively open into opposite ends of the cylinder bore 33 on opposite sides of the piston head 44 of the piston 34. Pipes 45 and 46 threaded into the ports 42 and 43 serve to admit and discharge pressure fluid from the cylinder bore 33 so as to reciprocate the outer piston 34. The pipes 45 and 46 are connected to a conventional hydraulic circuit operating the press 10. Such circuits are well-known to hydraulic engineers and contain the usual pumps and valves for generating and distributing pressure fluid. The details of such circuits form no part of the present invention, and any convenient circuit may be used.

The lower end wall 47 of the piston 34 is provided with a threaded bore 48 into which is threaded a hollow screw shaft 49 for adjustment purposes, a threaded lock nut or collar 50 being threaded upon the screw shaft 49 adjacent the end wall 47 of the piston 34. The hollow shaft 49 is provided with an internal bore 51 extending from one end to the other and at its lower end the shaft 49 is provided with an enlargement or flange 52 which fits into a socket 53 in a cup-shaped member 54 and is held therein by a retaining ring 55 and retaining screws 56. The retaining ring 55 and cup-shaped member 54 are bored for the passage of the retaining screws 56 which are threaded into threaded holes 57 in the platen 16 or 17, as the case may be. The cup-shaped member 54, in turn, fits into a socket 58 in the platen 16 or 17 and is held therein by the same retaining screws 56. The enlargement or flange 52 on the lower end of the hollow shaft 49 is rotatable within the socket 53 and for this purpose the hollow shaft 49 is provided with diametrically opposite holes 59 into which the ends of a spanner or other suitable wrench (not shown) may be inserted in order to rotate the shaft 49 to thread it into and out of the bore 48 (Figure 3).

Mounted on the lower or inner side of the platen 16 or 17 is an annular member 60 and a spacing ring 61, both being secured to the platen 16 by screws 62, the member 61 being bored to receive the screws 62 and the latter being threaded into threaded holes 63 in the platen 16 or 17. The annular member 60 is provided with a socket 64 into which is fitted the correspondingly shaped enlargement 65 on the outer or upper end of a tubular molding plunger 66 having a bore 67 extending lengthwise therethrough and terminating in a reduced diameter bore 68 (Figure 4) at its inner end 69. Also threaded into a threaded bore 70 in the platen 16 or 17 is a threaded stop 71 (Figure 4) which is secured in its adjusted position by a lock nut 72. The stop 71 is engageable with a plug 73 which is inserted in a socket 74 in the table unit 19.

The hollow outer piston 34 is provided with a bore 75 (Figure 3) into which a tubular stem 76 fits. The tubular stem 76 extends downward from the cylinder head 41 and forms a part thereof. A packing 77 held in position by an annular gland 78 through the screws 79 prevents leakage between the stem 76 and the hollow piston 34 when the latter reciprocates. The stem 76 is provided with a bore 80 in which reciprocates a compound adjustable stroke piston, generally designated 81.

The adjustable stroke piston 81 includes a piston rod 82 having a bore or cavity 83 therein. The lower end of the piston rod 82 extends downward through the bore 51 and at its lower end is provided with a threaded socket 84 for receiving the threaded upper end of a plunger or core rod (not shown) when conditions demand its use. The piston rod 82 passes through a bore 85 in the lower end of the stem 76 and a packing 86 and gland 87 are held in place by screws 88 to prevent leakage. In order to prevent rotation of the piston rod 82, a key 89 or the like is provided and fits into a groove or keyway 90 in the stem 76. The upper end of the piston rod 82 carries a piston head 91 beneath which a pair of ports 92 open into the bore 93 in the piston rod 82.

Threaded into a counterbore 94 in the piston head 91 is a hollow threaded shaft 95 (Figure 3), the upper end of which carries a piston head 96 forming the other half of the compound adjustable stroke piston 81. In order to rotate the hollow threaded shaft 95 so as to move the piston head halves 91 and 96 toward or away from one another, the head half 96 is provided with a bore 97 of approximately square cross-section (Figure 8) through which passes a correspondingly squared shaft 98 having a hollow bore or passageway 99 extending lengthwise therethrough and terminating in a cross passage or ports 100 near its upper end. The hollow shaft 98 passes downward through a bore 101 from which it is spaced radially so as to provide a fluid passageway and clearance, and at its lower end is threaded to receive a bearing collar 102. The extreme lower end of the shaft 98 is reduced in diameter as at 103 and through it the passageway 99 opens into the bore 83. The bearing collar 102 rotatably as well as slidably engages the bore 101 and serves as support for the lower end of the squared shaft 98. The upper end of the squared shaft 98 is provided with an annular enlargement 104 which fits into a socket 105 so as to be rotatable therein, the socket 105 being provided in an inner cylinder head 106. The latter is secured by screws 107 to the outer cylinder head 41 and has a reduced diameter portion 108 fitting into the upper end of the bore 80. A port 109 communicates with the upper end of the bore 80 and is threaded to receive a pipe 110 for supplying pressure fluid thereto. A passageway 111 through the upper or outer piston head half 96 provides drainage for fluid which may collect between the two head halves 91 and 96. The enlarged portion 104 of the hollow shaft 98 is held in position by a retaining ring 112 which is secured thereto by screws 113, and a hand wheel 114 is mounted on the upper end of the shaft 98. The inner cylinder head 106 is provided with an annular chamber 115 into which a port 116 opens. Threaded into the port 116 is a pipe 117 for admitting or withdrawing pressure fluid.

*Molding plunger construction*

Figure 2:
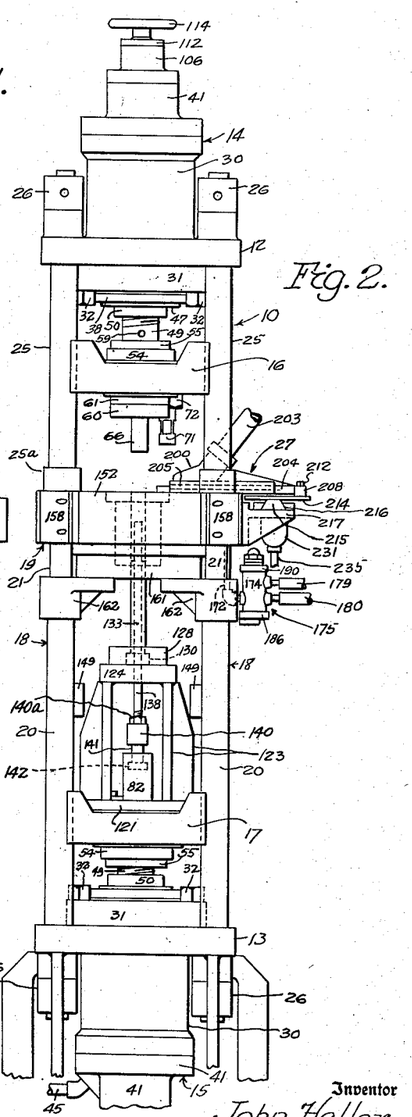
Figure 2 is a front elevation of the molding press shown in Figure 1, with the lower portion of the lower cylinder removed.
Figures 6, 7:
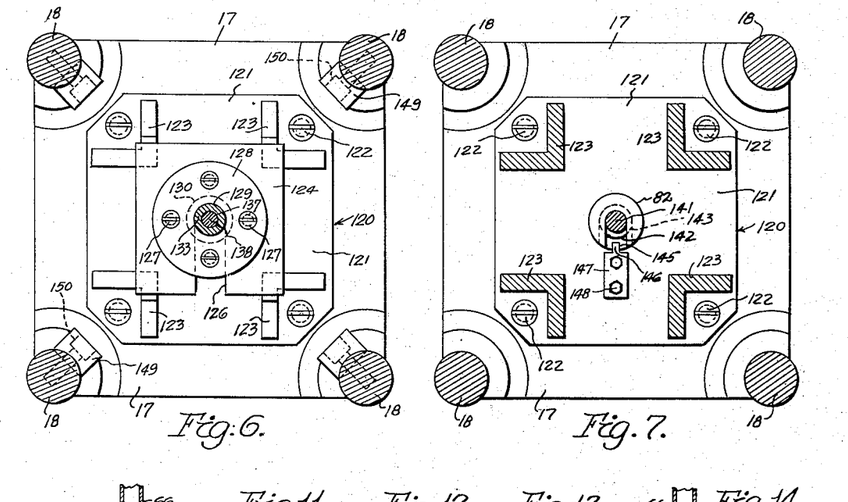
Figure 6 is an enlarged horizontal section taken along the line 6—6 in Figure 1, immediately above the lower tubular plunger supporting structure.
Figure 7 is an enlarged horizontal section, taken along the line 7—7 in Figure 1, immediately above the lower press platen.

As previously stated, the lower reciprocable hydraulic motor 15 is similar in construction to the upper hydraulic motor 14 up to and including its platen 17 corresponding to the platen 16 of the motor 14. Mounted on the lower platen 17, however, is a plunger supporting structure, generally designated 120 (Figures 4, 6 and 7). The structure 120 consists of a rectangular base plate 121 secured as by the screws 122 to the platen 17 (Figure 6). Mounted approximately adjacent the four corners of the rectangular base plate 121 and rising therefrom are four uprights 123 of angle or L-shaped cross-section and tapering in an upward direction (Figures 1 and 2). Secured as by welding to the tops of the uprights 123 is a platform 124 having a central aperture 125 with a slot 126 extending into the aperture 125 from the edge of the platform 124. Secured as by screws 127 to the platform 124 is a circular block 128 having a central bore 129 (Figure 4) coaxial with the bore 125 and opening into an enlarged counterbore 130 beneath the bore 129. Secured within the counterbore 130 and resting upon the upper surface 131 of the platform 124 is the enlarged base 132 of the lower outer tubular plunger 133 which rises through the bore 129 and at its upper end 134 enters the bottom of the die cavity 135 in a die 136, as described below. The tubular plunger 133 is provided with a longitudinal bore 137 (Figure 4) through which the lower inner plunger or core rod 138 moves upward, so that its upper end 139 likewise enters the die cavity 135. The lower end of the core rod or inner plunger 138 is threaded into an adapter 140 (Figures 1 and 2) and locked in position by a lock nut 140a.

Threaded into the lower end of the adapter 140 is a shank 141 carrying a head 142 which is inserted in an undercut socket 143 having a slot 144 (Figure 7) extending outward to the edge of the lower inner piston rod. In other words, the upper end of the lower piston rod 82 has an undercut socket 143 (Figure 2), whereas the lower end of the upper inner piston rod 82 has a threaded socket 84 (Figure 3), the upper and lower piston rods 82 being otherwise of the same construction. In order to prevent the lower inner piston rod 82 from rotating, it is provided with a longitudinal groove 145 which is engaged by a tongue 146 on a plate 147 (Figure 7) secured as by the screws 148 to the base plate 121. In order to limit the rise of the lower platen 17, stop blocks 149 (Figures 1, 2 and 6) are secured to the strain rods 18 on their inner edges, as by the screws 150.

*Floating table unit construction*

The die 136 containing the die cavity 135 is mounted in a central bore 151 in a floating table 152 forming a part of the floating table unit 19 (Figure 4), the die 136 having an upper flange 153 fitting into a corresponding counterbore 154. The table 152 (Figure 5) is of approximately rectangular outline and at its four corners is provided with bearing bosses 155 with semi-cylindrical bores 156 matched by corresponding semi-cylindrical bores 157 in bearing caps 158 secured by the screws 159 to the bearing bosses 155. The bores 156, 157 surround and slidably engage the intermediate portions 21 of the strain rods 18 so as to guide the table 152 in its reciprocation upward and downward. On its underside, the table 152 is provided with an annular chamber 160 (Figure 4) which moves up and down upon an annular piston 161. The annular piston 161 is stationary and is secured at its lower end to inwardly extending brackets 162 which in turn are bored as at 163 to receive the intermediate strain rod portion 21 and to rest upon the shoulders 23 between the intermediate and lower portions 21 and 20. Inner and outer annular packings 164 and 165 are provided adjacent the mouth of the chamber 160 and are held in engagement with the table 152 and annular piston 161 by inner and outer clamping rings or glands 166 and 167 secured to the table 152 by the screws 168 and 169 respectively.

In order to admit or discharge fluid from the chamber 160, a passageway 170 is provided in the table 152 (Figure 4) leading to a threaded port 171. Threaded into the port 171 is a pipe 172 which leads to a port 173 in the casing 174 of a pressure-regulating valve 175. The casing 174 is also provided with a bore 176 into which the port 173 opens and from which spaced threaded ports 177 and 178 also lead. Threaded into the ports 177 and 178 are pipes 179 and 180 for the admission or discharge of pressure fluid from the valve 175.

Figures 15, 17:
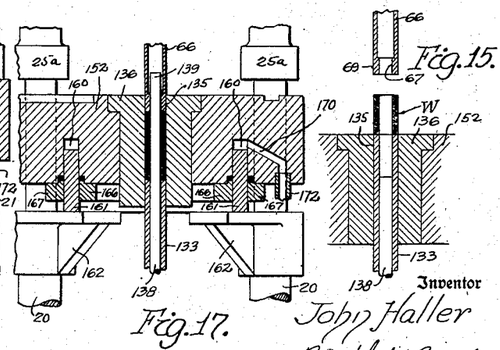
Figure 15 is a view similar to Figure 14, but showing the lower tubular plunger still further advanced upward to eject the workpiece.
Figure 17 is a view similar to Figure 16, but showing the position of the parts after the die table has yielded and moved downward, imparting a greater density to the lower portion of the workpiece.
Figure 16:
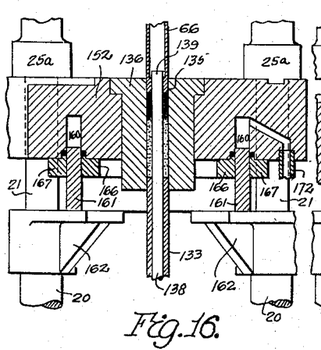
Figure 16 is a central vertical section similar to the central portion of Figure 4, but showing the workpiece at the stage of Figure 12 wherein partial compression has taken place but wherein the upper portion of the workpiece has a greater density than the lower portion.
Figure 18:
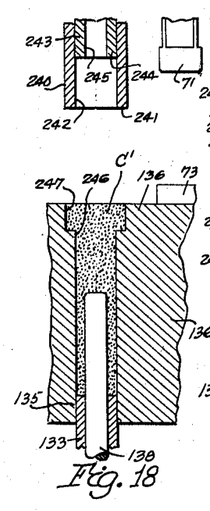
Figure 18 is a view similar to Figure 10, but showing the position of the parts preparatory to molding a flanged workpiece, immediately after the charging operation.
Figures 19, 20:
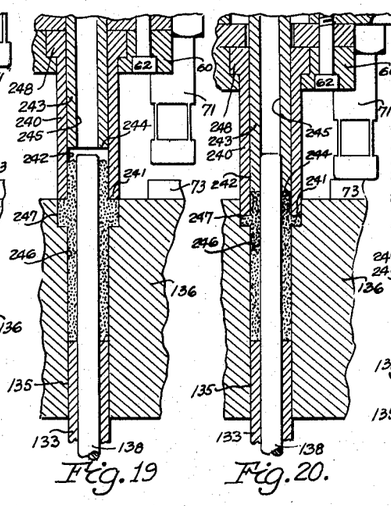
Figure 19 is a view similar to Figure 18, but showing the core rod and upper plungers advanced toward one another to close the die cavity in a manner analogous to Figure 11.
Figure 20 is a view similar to Figure 19, but showing the outer and inner upper tubular plungers advanced downward to compress the upper portion of the workpiece, together with its flange, in a manner analogous to Figure 12.

Reciprocably mounted in the bore 176 is a piston valve member 181 having spaced heads 182 and 183 interconnected by a reduced diameter stem 184. The bore 176 at its lower end opens into a reduced diameter bore 185 in an end cap 186. The bore 185 contains a pilot piston 187 having a stop pin 188 extending downward from its lower end to the lower end of the bore 185. Extending downward from the port 173 to the lower end of the pilot piston bore 185 is a passageway 189. The upper end of the bore 176 is closed by annular members or spacers 190 and 191 surmounted by an upper end cap 192, these three members containing continuous threaded bores 193, 194 and 195 of the same diameter and pitch. Threaded into the bores 193, 194 and 195 is a cup-shaped adjusting screw 196 within which is placed a compression spring 197, the upper end of which engages the upper end of the cavity within the adjusting screw 196. The lower end of the spring 197 engages the upper end of the piston valve member 181 and urges it constantly downward. Thus, the valve 181 moves up and down with the table 152 and is supported either by the pipe 172 or by any suitable bracket (not shown). In order to permit such motion while supplying and withdrawing fluid from the valve 181, the pipes 179 and 180 may either be flexible pipes or have pressure-tight elbow joints (not shown). Such arrangements are well-known in the hydraulic art and form no part of the present invention. Figures 16 and 17 show the upper and lower limits of motion of the table 152 and consequently of the pipe 172 and the valve 175 and the pipes 179 and 180 connected to it.

*Die cavity charging device*

Slidably mounted upon the upper surface of the floating table 152 and die 136 is a charging spout or filler shoe 200 having a powdered material passageway 201 with a mouth 202 at the lower end adapted to slide over the mouth of the die cavity 135. Connected to the upper end of the passageway 201 is a pipe 203 leading to a supply hopper (not shown) containing the powdered metal or other powdered material to be supplied to and compressed within the die cavity 135. The spout or shoe 200 at its lower end is mounted on a reciprocating charging slide 204 in the form of a rectangular plate (Figure 5) which is guided to and fro by parallel overhanging guide bars 205 secured to the table 152 as by the screws 206. A strengthening rib 207 extends lengthwise along the slide 204 from the rearward side of the spout or shoe 200 to a boss 208 at the rearward end of the slide. The boss 208 is bored vertically as at 209 to receive a pivot bolt 210 upon the lower end of which a follower roller 211 is rotatably mounted, the upper end being secured in position by a nut 212 (Figure 4).

To reciprocate the charging spout 200, the roller 211 is mounted in a cam groove 213 (Figures 5 and 9) located in a plate or cam slide 214 which in turn is provided with a dovetail rib 215 (Figure 4) extending downward from the lower side thereof into a corresponding dovetail slot or groove 216 in an angle bracket 217 secured by the screws 218 to the side of the table 152. In this manner, the plate or cam slide 214 is reciprocable in a direction at right angles to the charging slide 204.

The cam groove 213 consists of a diagonal rectilinear portion 219 extending obliquely across the cam slide 214 and terminating at one end in an undulating portion 220 which extends lengthwise along the slide 214. The undulating portion 220 imparts a shaking motion to the charging slide 204 and charging spout 200 in order to shake the particles of material loose from the passageway 201 and prevent packing or adhesion at the time the spout 200 is over the die cavity 135.

In order to reciprocate the cam slide 214, an angle member 221 (Figure 9) is secured as at 222 to the underside of the slide 214 and is bored as at 223 to receive the reduced diameter end of a piston rod 224. A nut 225 is threaded upon the end of the piston rod 224 to secure it to the angle member 221. The piston rod 224 passes through a bore 226 in the head 227 of a cylinder 228 and on its inner end carries a piston head 229 which is reciprocable within the cylinder bore 230. The opposite end of the cylinder 228 is closed by a cylinder head 231. The cylinder heads 227 and 231 are provided with ports 232 and 233 into which are threaded pipes 234 and 235 respectively. The cylinder head 231 is secured by the screw 236 to the angle bracket 217.

*Operation*

Figure 10:
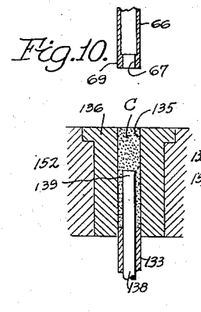
Figure 10 is a diagrammatic central vertical section through the die cavity showing the positions of the various plungers immediately after the charging operation but prior to the pressing operations.

Prior to the operation of the press, the various pipes previously described are connected to a conventional hydraulic circuit (not shown) including a pump and a source of suitable operating fluid, such as oil. To operate the press, the lower hydraulic motor 15 is first actuated so as to cause the outer piston 34 thereof to raise the lower platen 17 and plunger supporting structure 120 to the position shown in Figure 4, where the upper end 134 of the tubular plunger 133 enters the lower end of the die cavity 135. At the same time, the inner piston 91 is reciprocated to raise the top 139 of the core rod or inner plunger 138 to a position higher in the die cavity 135 than the upper end 134 of the tubular or outer plunger 133. The cavity is now ready for filling with molding material, and the parts occupy the positions shown in Figure 5 and diagrammatically in Figure 10. The floating die table 152 is also moved to its highest position, as shown in Figure 4, by supplying pressure fluid to the pipe 180.

Figures 5, 9:
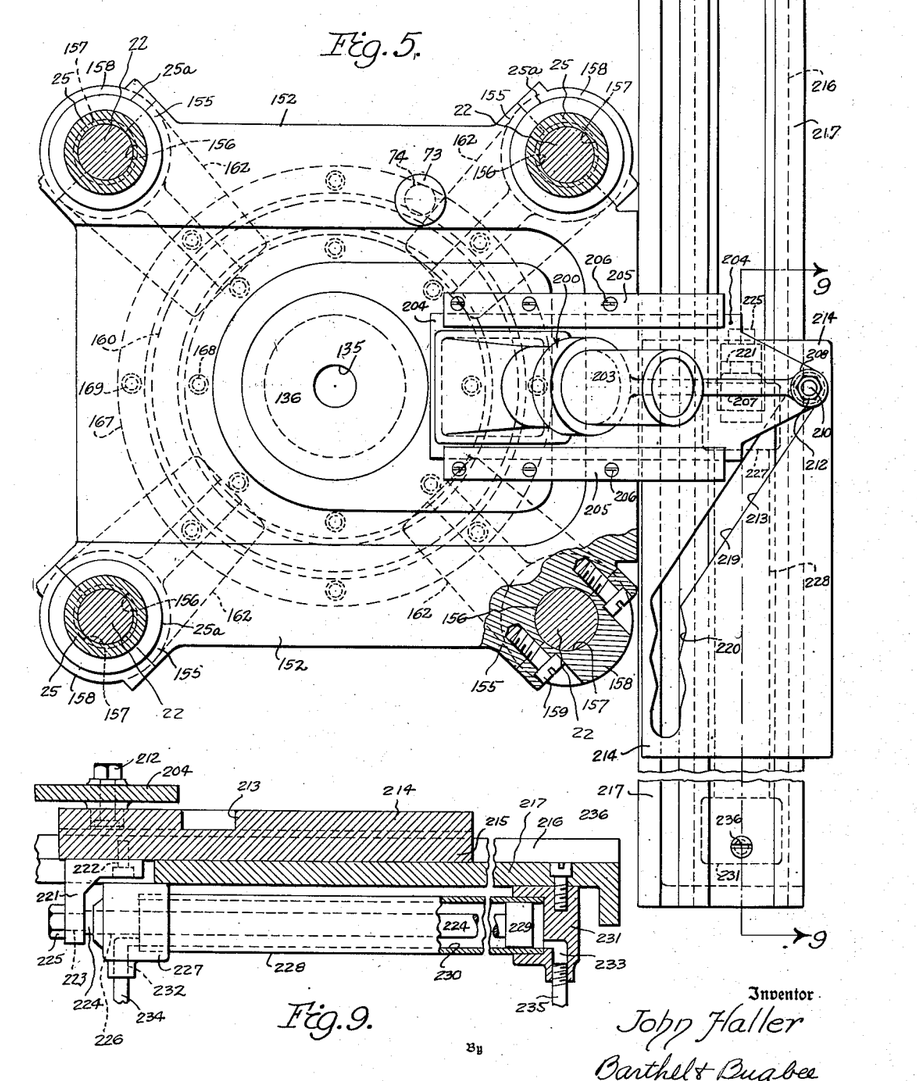
Figure 5 is an enlarged horizontal section taken along the line 5—5 in Figure 1, showing the charging apparatus and floating die table.
Figure 9 is a vertical section taken along the line 9—9 in Figure 5 and showing the piston and cylinder unit for actuating the charging apparatus shown in Figure 5.

To charge the die cavity 135 with powdered metal, such as powdered iron, a sufficient quantity of the powdered metal is placed in the hopper (not shown) above the pipe 203, falling through the latter into the charging spout or shoe 200 and filling the passageway 201 therein. Pressure fluid is now supplied through the pipe 235 (Figure 9) to reciprocate the piston 229 and piston rod 224, thereby moving the cam slide 214 rearwardly (Figure 5). As this occurs, the cam groove 213 moves rearwardly, causing the roller 211 therein to move the slide 204 and charging spout 200 forward over the mouth of the die cavity 135. The powdered metal in the passageway 201 of the spout 200 drops downward into the die cavity 135, filling the cavity with a charge C. As the roller 211 encounters the undulating portion 220 of the cam groove 213, the slide 204 and spout 200 are shaken vigorously, dislodging particles of metal adhering to the walls of the passageway 201 and preventing any binding or clogging of the material therein. Pressure fluid is now admitted to the pipe 234 and discharged from the pipe 235 (Figure 9) to reciprocate the cam slide 214 forward into the position of Figure 5. This action retracts the cam slide 204 and charging spout 200 to the position shown in Figures 4 and 5.

The lower and upper reciprocating hydraulic motors 15 and 14 are now operated to advance the core rod or inner plunger 139 upward through the die cavity 135 and at the same time to advance the tubular plunger 66 downward until its end 69 closes the die cavity 135 and the upper end 139 of the core rod 138 enters the bore 67. This action entraps the powdered metal in the die cavity and the parts now occupy the position shown diagrammatically in Figure 11.

Figures 11, 12:
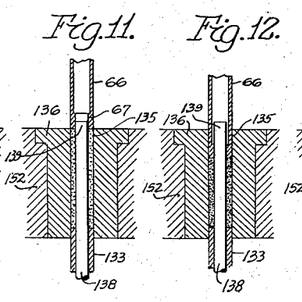
Figure 11 is a view similar to Figure 10 but showing the lower core rod and upper tubular plunger advanced toward one another to form a tubular charge of molding powder in the die cavity.
Figure 12 is a view similar to Figure 11 but showing the upper tubular plunger advanced downward to initially compress the charge.
Figures 13, 14:
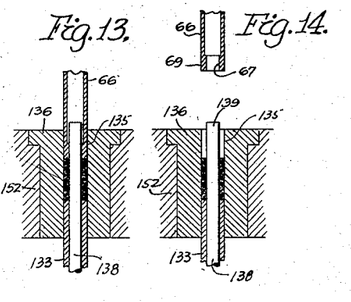
Figure 13 is a view similar to Figure 12 but showing the lower tubular plunger advanced upward to further compress the charge.
Figure 14 is a view similar to Figure 13 but showing the upper tubular plunger retracted preparatory to ejection of the workpiece.

The upper plunger 66 is now caused to move downward in the manner shown in Figure 12, initially compressing the charge C. As the charge is compressed, the powdered metal particles engage the side wall of the die cavity 135 and friction is set up. As the compression proceeds, this friction increases so as to offer such resistance as would otherwise seriously impede the progress of the molding and has, in fact, so impeded molding in prior presses. Thus, the powdered metal particles nearest the lower end 69 of the upper plunger 66 receive the maximum amount of compression and therefore receive the greatest density at the initial stage of the compression, as shown by the denser black appearance of the upper portion of the charge in Figure 16.

The floating table 152 now comes into operation to yield downward when the resistance rises beyond a predetermined pressure as determined by the adjustment of the pressure regulating valve 175. When this pressure is exceeded, the pressure fluid passing into the pilot bore 185 raises the pilot piston 187 (Figure 4) and shifts the piston valve member 181 upward, overcoming the downward thrust of the spring 197. When this occurs, the upper head 182 rises sufficiently to uncover the port 177, permitting pressure fluid to escape through the discharge pipe 179 which leads back to the suction side of the pump or to a reservoir as the case may be. The lower head 183, however, does not rise high enough to cut off the ports 173 and 178, but is provided merely for balancing the valve member 181. When the valve member 181 is raised in this manner, the subsequent discharge of pressure fluid arriving through the pipe 180 and port 178 from the pump, accumulator or other source of pressure fluid, is by-passed through the valve bore 176 into the port 177, escaping through the discharge pipe 179. The excessive pressure generated by the molding procedure thus permits fluid to escape from the annular chamber 160 through the passageway 170, pipe 172 (Figure 4) and valve 175, permitting the table 152 to move downward. As it does so, the table 152 causes the side wall of the cavity 135 to move downward relatively to the charge C, so that the latter becomes progressively compressed to the desired density from the top to the bottom. The charge thus reaches a more nearly uniform density, as shown in Figure 17, than is possible by prior molding processes with a stationary die table.

When the charge has become fully compressed and the floating die table 152 has moved downward a sufficient distance, such as is shown in Figure 17, the lower pistons of the lower hydraulic motor 15 are reciprocated in opposite directions in the manner shown in Figure 15 to move the core rod or inner plunger 138 downward and at the same time to move the outer tubular plunger 133 upward, while the upper plunger 66 is retracted upward by operating the upper hydraulic motor 14. This action ejects the work-piece W formed by compressing the charge C, and clears the die cavity 135. The workpiece W is then removed and transferred to a sintering oven for further operation. The lower plungers 133 and 138 are then moved downward to the position of Figure 4, and the table 152 moved upward to its raised position shown in Figures 4 and 16 and the press is ready for another compression stroke by repeating the foregoing operation.

The preferred process of the present invention thus consists in charging a die cavity with powdered material such as powdered metal, compressing the charge in the die cavity from opposite directions until a predetermined pressure has been attained, and moving the die cavity longitudinally away from the direction of the pressing force. This procedure is continued until the initial density at one end of the charge is transmitted successively to the remainder of the charge, whereupon the workpiece thus molded is ejected from the die cavity.

*Modified process of making flanged powdered metal workpieces*

Figure 23:
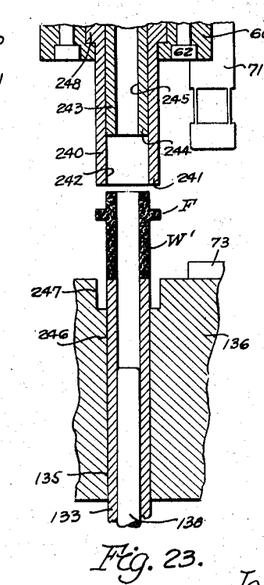
Figure 23 is a view similar to Figure 22, but showing the lower tubular plunger advanced upward to eject the molded workpiece in a manner analogous to Figure 15.
Figure 24:
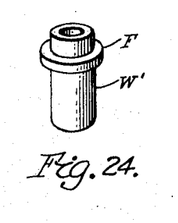
Figure 24 is a perspective view of the flanged powdered metal workpiece produced by the press and process of this invention.

Figures 18 to 23 inclusive illustrate the successive stages of making a flanged workpiece W' (Figure 24). This modified process employs the same molding press as the process previously described, except that the upper tubular plunger 66 is replaced by an outer tubular plunger 240 having a lower end 241 and a straight cylindrical bore 242 in which an inner tubular plunger 243 with a lower end 244 is reciprocable. The inner tubular plunger 243 has a straight cylindrical bore 245 which, like the corresponding bore 68 of Figure 4, receives the upper end of the inner lower plunger or core rod 138. The outer tubular plunger 133 and the die 136 remain the same in Figure 18, but the die cavity 246 is provided with a counterbore or enlargement 247 at its upper end or mouth for forming the flange F on the workpiece. The outer upper tubular plunger 240 is mounted in the same manner as the tubular plunger 66 and is provided with an annular enlargement or head 248 (Figure 19) similar to the enlargement 65 on the upper tubular plunger 66 (Figures 3 and 4). The inner tubular plunger 243, however, is threaded at its upper end into the socket 84 described in connection with Figures 3 and 4.

In the operation of the molding press 10 to produce a flanged workpiece W', the die cavity 246 is filled with a charge C' of powdered metal in the manner previously described in connection with Figure 4, with the table 152 and the lower outer and inner plungers 133 and 138 occupying the same relative positions. After the charging spout or shoe 200 has delivered a charge C' to the die cavity 246 and has been retracted in the manner previously described, the outer upper tubular plunger 240 descends until its lower end 241 is substantially flush with the upper surface of the die 136 and the lower inner plunger 138 is caused to rise in the manner shown in Figure 19, pushing the surplus powdered metal ahead of it. The upper outer and inner tubular plungers 240 and 243 are then caused to descend to the positions shown in Figure 20, compressing the charge C'. Due to the friction arising between the metal particles and the side wall of the die cavity 246, however, the upper portion of the workpiece will be compressed to a greater density than the intermediate portion, as indicated by the more densely stippled area in the upper portion of the workpiece in Figure 20.

Figure 21:
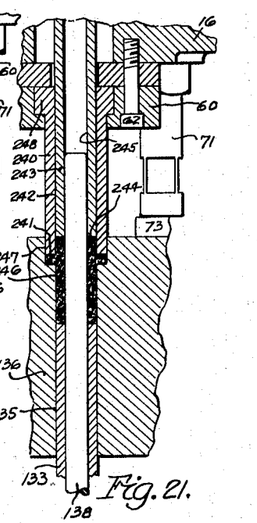
Figure 21 is a view similar to Figure 20, but showing the die table moved downward, further compressing the lower portion of the workpiece and making its density more uniform in a manner analogous to Figure 13.
Figure 22:
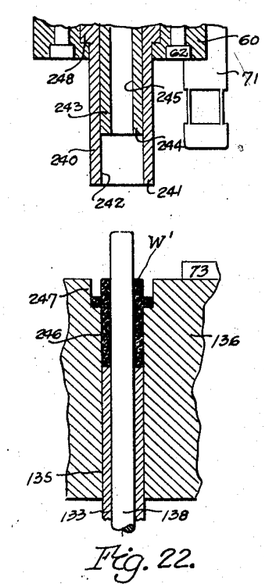
Figure 22 is a view similar to Figure 21, but showing the upper tubular plungers retracted to permit ejection of the molded workpiece, in a manner analogous to Figure 14.

Meanwhile, the upper platen 16 has descended until the stop 71 engages the plug 73, whereupon further downward motion of the upper platen 16 causes the die 136 and floating table 152 to be pushed downward in the manner previously described, thereby progressively compressing the remainder of the charge to a greater density, as indicated by the density stippled area in Figure 21. The upper platen 16 together with the upper outer and inner tubular plungers 240 and 243 are then retracted upward to the position of Figure 22, leaving the workpiece W' ready to be ejected. Ejection is then accomplished by advancing the lower platen 17 upward in the same way described in connection with Figure 4, while leaving the inner plunger or core rod 138 stationary, as shown in Figure 23. This action strips the workpiece W' off the core rod 138 and at the same time raises the workpiece W' to the level of the upper surface of the die 136. The workpiece may then be removed, whereupon the moving parts are returned to their positions shown in Figure 18 and the die cavity again recharged with powdered metal in the previously described manner in order to mold another workpiece W'.

What I claim is:

1. A compound hydraulic motor comprising an outer hydraulic cylinder having an outer bore with axially-spaced fluid passageways communicating therewith, said outer cylinder having an aperture in one end thereof, a hollow outer piston reciprocably mounted in said outer bore and having a bore therein coaxial with said outer cylinder bore, an outer piston rod connected to said outer piston and extending externally of said outer cylinder, an inner hydraulic cylinder extending from the exterior of said outer cylinder inwardly through said outer cylinder aperture into sliding engagement with said outer piston bore, said inner cylinder having a bore therein coaxial with said outer cylinder bore and said outer piston bore, said inner cylinder having an aperture in one end thereof and having axially-spaced fluid passageways communicating with said inner cylinder bore, a compound inner piston reciprocably mounted in said inner cylinder bore and having a pair of relatively movable heads connected to one another and separable axially from one another, and mechanism extending from the exterior of said inner cylinder through said inner cylinder aperture and operatively engaging and adjustably moving one of said heads relatively to the other head.

2. A compound hydraulic motor comprising an outer hydraulic cylinder having an outer bore with axially-spaced fluid passageways communicating therewith, said outer cylinder having an aperture in one end thereof, a hollow outer piston reciprocably mounted in said outer bore and having a bore therein coaxial with said outer cylinder bore, an outer piston rod connected to said outer piston and extending externally of said outer cylinder, an inner hydraulic cylinder extending from the exterior of said outer cylinder inwardly through said outer cylinder aperture into sliding engagement with said outer piston bore, said inner cylinder having a bore therein coaxial with said outer cylinder bore and said outer piston bore, said inner cylinder having an aperture in one end thereof and having axially-spaced fluid passageways communicating with said inner cylinder bore, a compound inner piston reciprocably mounted in said inner cylinder bore and having a pair of relatively movable heads connected to one another and separable axially from one another, one of said heads having a threaded stem and the other head having a threaded hole threadedly receiving said stem, and mechanism extending from the exterior of said inner cylinder through said inner cylinder aperture and operatively engaging and adjustably moving one of said heads relatively to the other head.

3. A compound hydraulic motor comprising an outer hydraulic cylinder having an outer bore with axially-spaced fluid passageways communicating therewith, said outer cylinder having an aperture in one end thereof, a hollow outer piston reciprocably mounted in said outer bore and having a bore therein coaxial with said outer cylinder bore, an outer piston rod connected to said outer piston and extending externally of said outer cylinder, an inner hydraulic cylinder extending from the exterior of said outer cylinder inwardly through said outer cylinder aperture into sliding engagement with said outer piston bore, said inner cylinder having a bore therein coaxial with said outer cylinder bore and said outer piston bore, said inner cylinder having an aperture in one end thereof and having axially-spaced fluid passageways communicating with said inner cylinder bore, a compound inner piston reciprocably mounted in said inner cylinder bore and having a pair of relatively movable heads connected to one another and separable axially from one another, and mechanism extending from the exterior of said inner cylinder through said inner cylinder aperture and operatively engaging and adjustably moving one of said heads relatively to the other head, said outer piston having a threaded aperture therein and a threaded piston rod threadedly engaging said aperture and extending externally of said outer cylinder.

4. A compound hydraulic motor comprising an outer hydraulic cylinder having an outer bore with axially-spaced fluid passageways communicating therewith, said outer cylinder having an aperture in one end thereof, a hollow outer piston reciprocably mounted in said outer bore and having a bore therein coaxial with said outer cylinder bore, an outer piston rod connected to said outer piston and extending externally of said outer cylinder, an inner hydraulic cylinder extending from the exterior of said outer cylinder inwardly through said outer cylinder aperture into sliding engagement with said outer piston bore, said inner cylinder having a bore therein coaxial with said outer cylinder bore and said outer piston bore, said inner cylinder having an aperture in one end thereof and having axially-spaced fluid passageways communicating with said inner cylinder bore, a compound inner piston reciprocably mounted in said inner cylinder bore and having a pair of relatively movable heads connected to one another and separable axially from one another, one of said heads having a threaded stem and the other head having a threaded hole threadedly receiving said stem, and mechanism including a shaft drivingly and axially slidably engaging one of said heads, said shaft extending from the exterior of said inner cylinder through said inner cylinder aperture and operatively engaging and adjustably moving one of said heads relatively to the other head.

JOHN HALLER.

References Cited in the file of this patent

UNITED STATES PATENTS

| Number | Name | Date |
|---|---|---|
| 1,766,265 | Smith | June 24, 1930 |
| 1,806,300 | Lemming | May 19, 1931 |
| 1,820,235 | Lemming | Aug. 25, 1931 |
| 1,974,214 | Glasner | Sept. 18, 1934 |
| 2,398,227 | Hubbert | Apr. 9, 1946 |
| 2,433,654 | Dinzl | Dec. 30, 1947 |
| 2,449,008 | Pecker | Sept. 7, 1948 |
| 2,608,826 | Haller | Sept. 2, 1952 |